Figure 17:
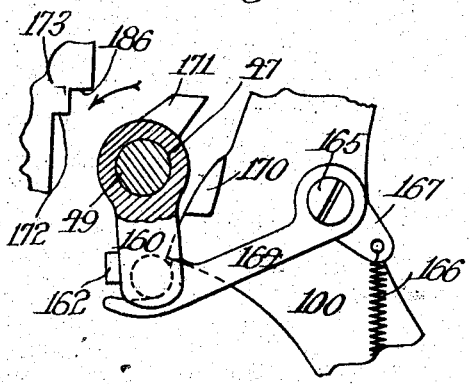
Figure 18:
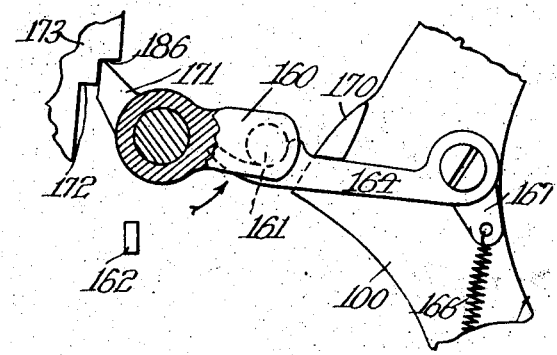
Figure 19:
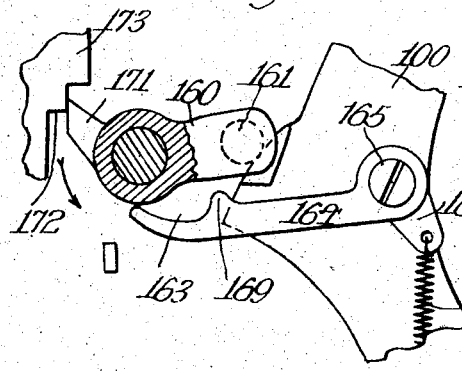
Figure 20:
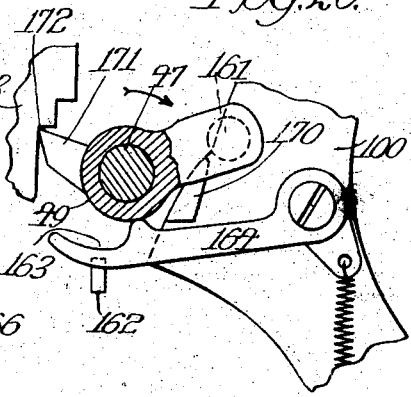

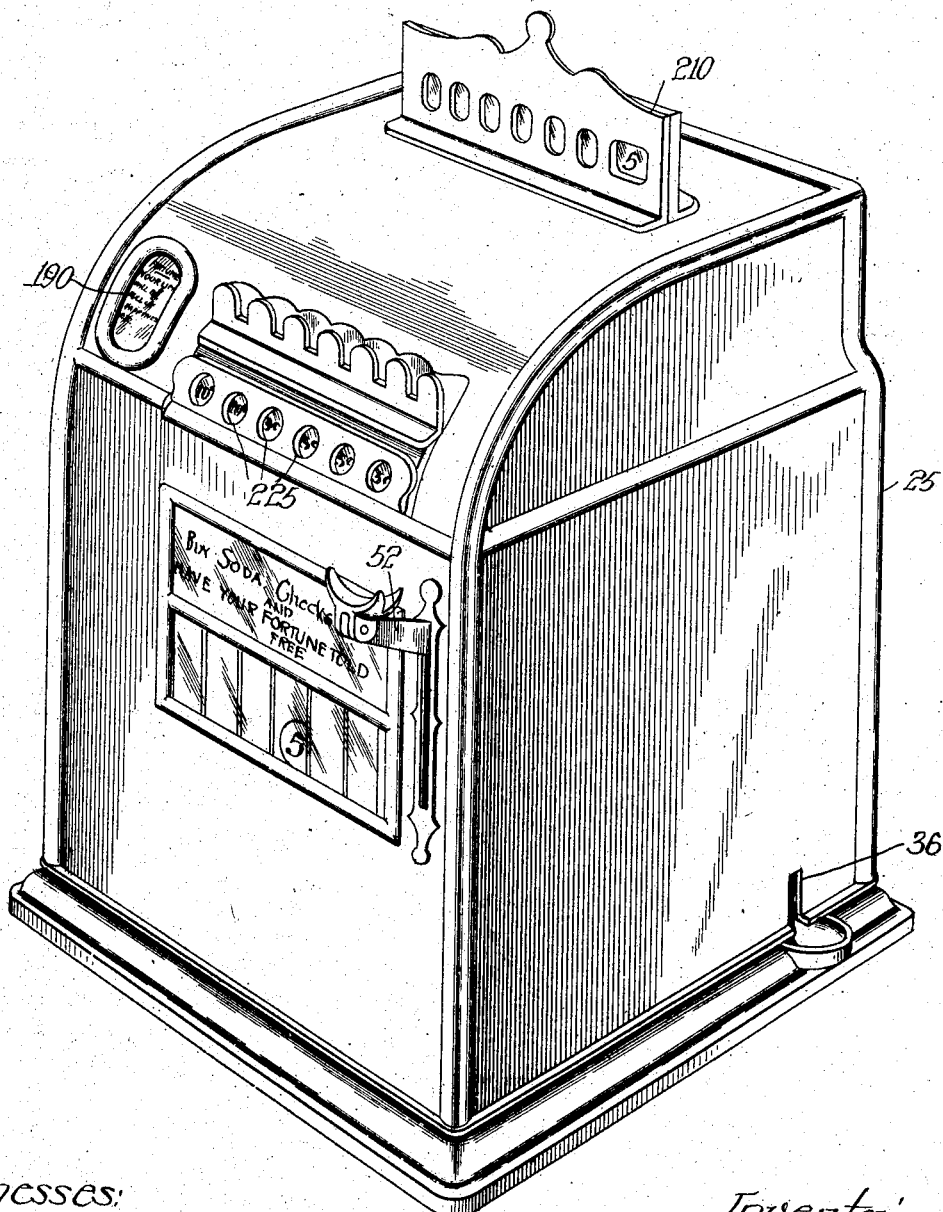

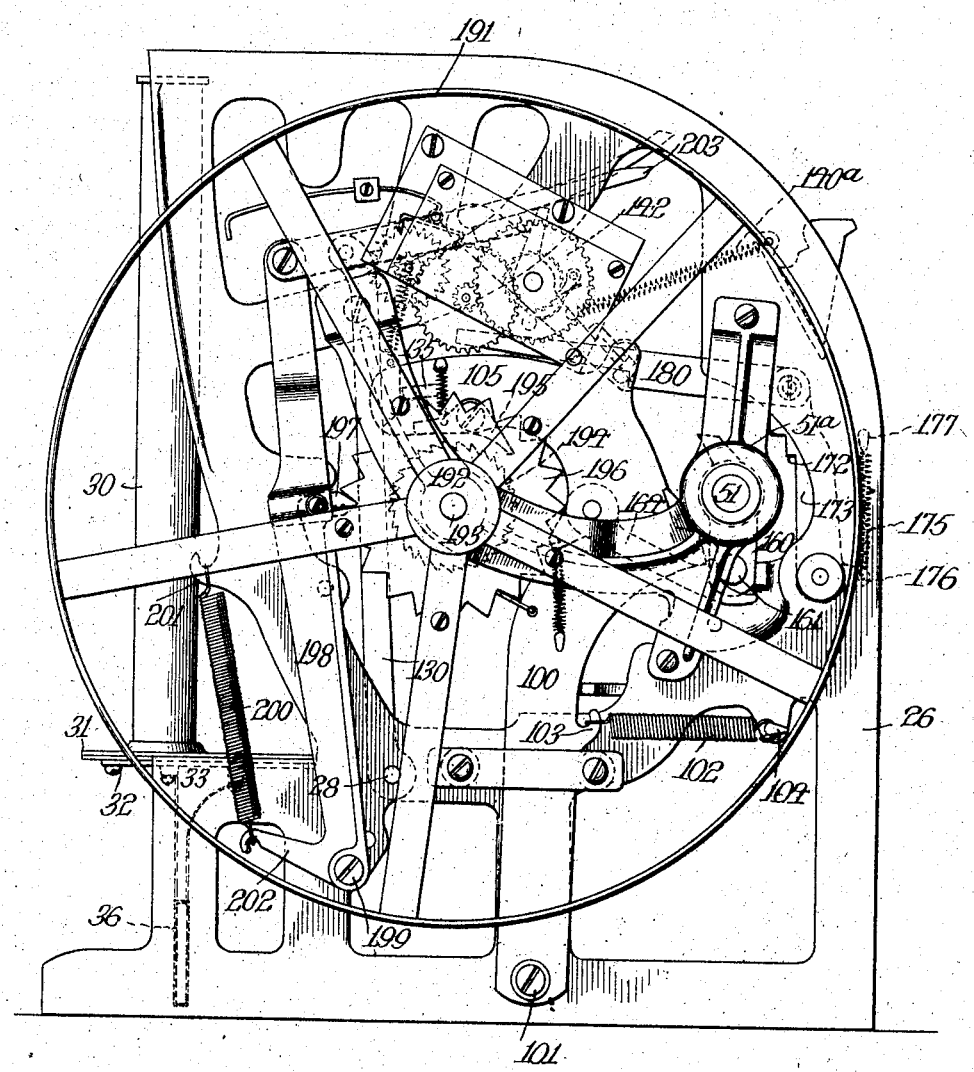

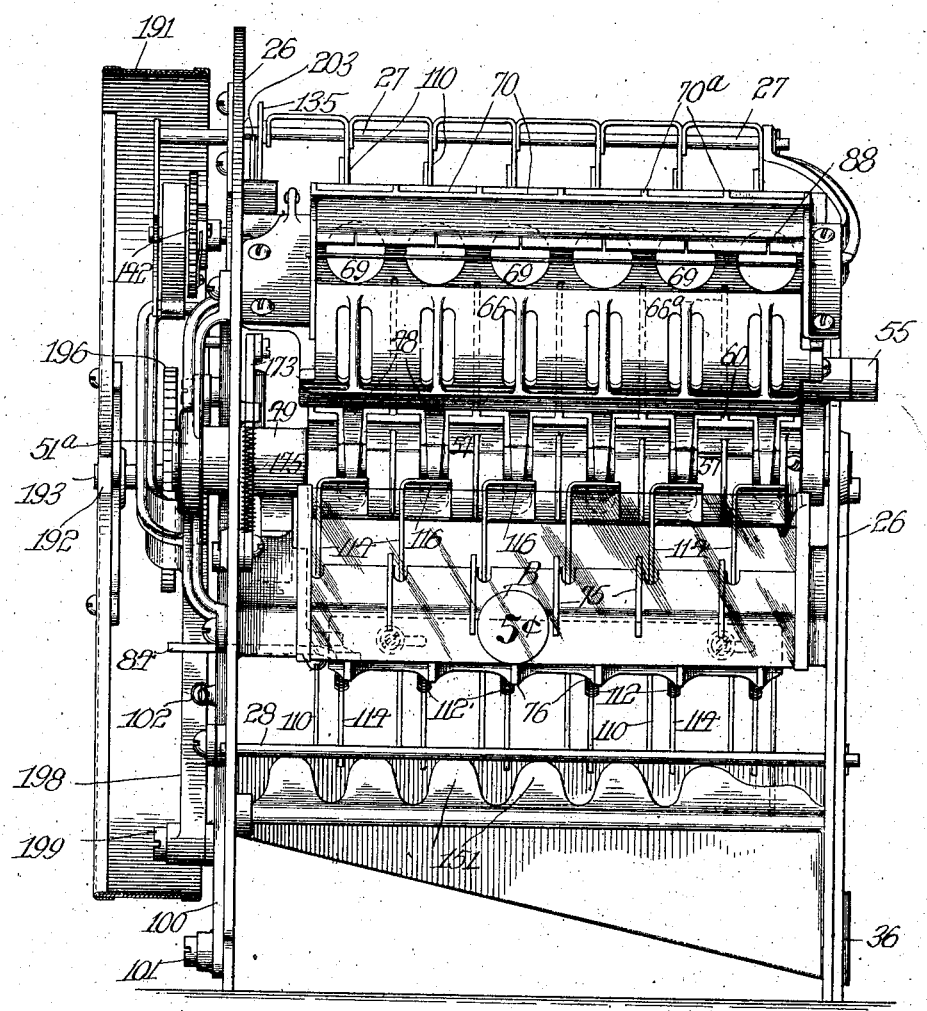

No. 839,192. PATENTED DEC. 25, 1906.
J. PAUPA & G. F. HOCHRIEM.
VENDING MACHINE.
APPLICATION FILED FEB. 5, 1906.
10 SHEETS—SHEET 4.
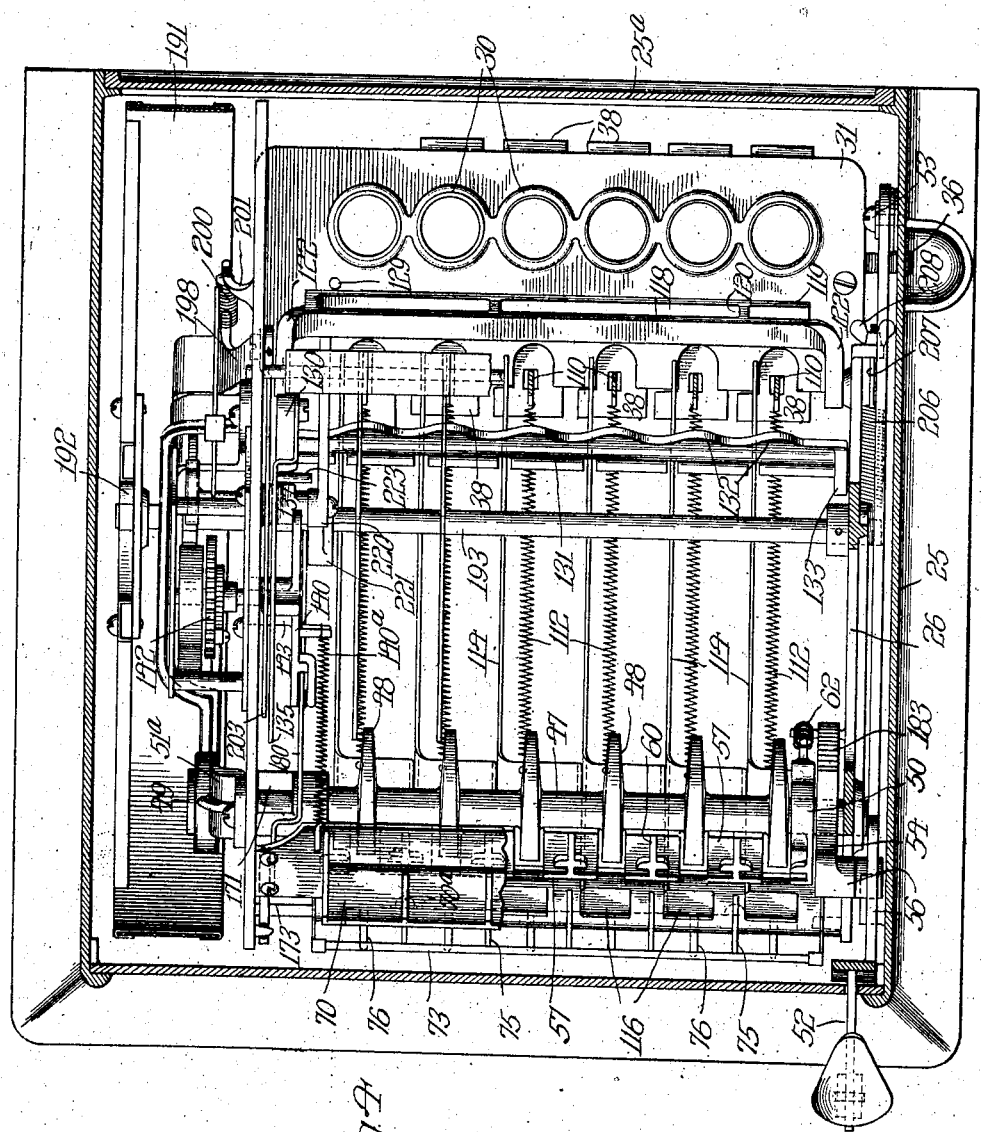
Witnesses:
Inventors
Joseph Paupa
Gustave F. Hochriem
by Poole & Brown Atty's.

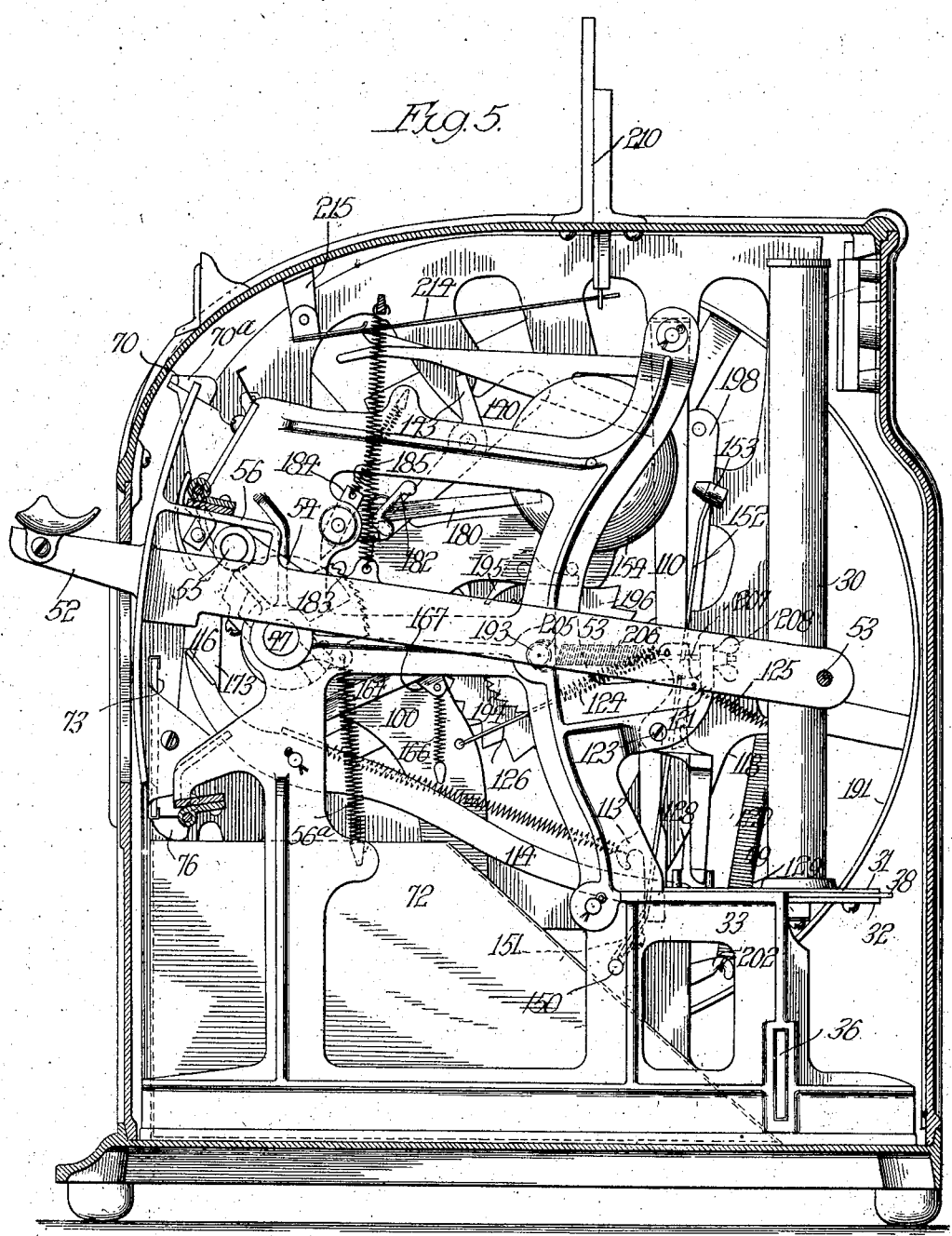

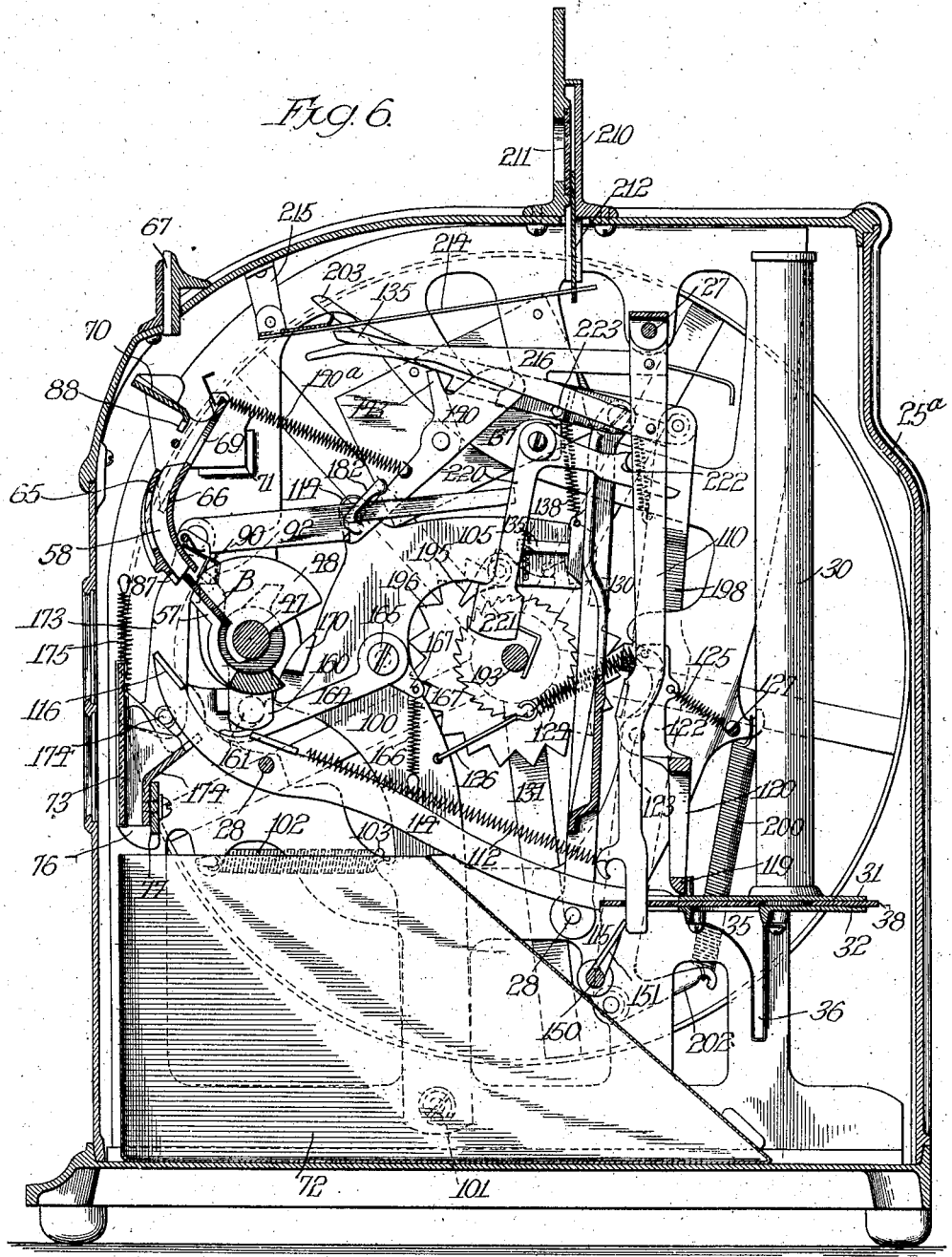

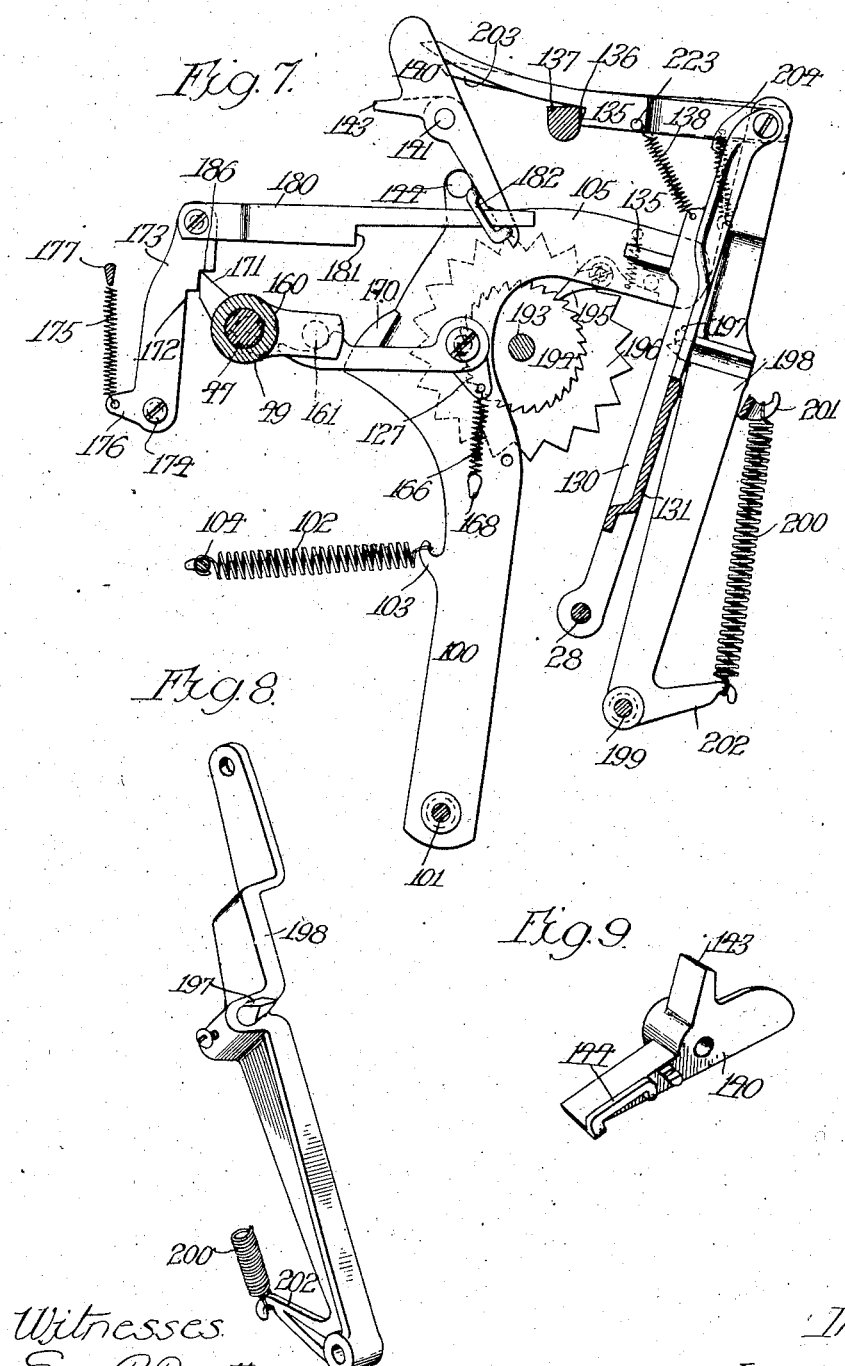

No. 839,192. PATENTED DEC. 25, 1906.
J. PAUPA & G. F. HOCHRIEM.
VENDING MACHINE.
APPLICATION FILED FEB. 5, 1906.
10 SHEETS—SHEET 8.
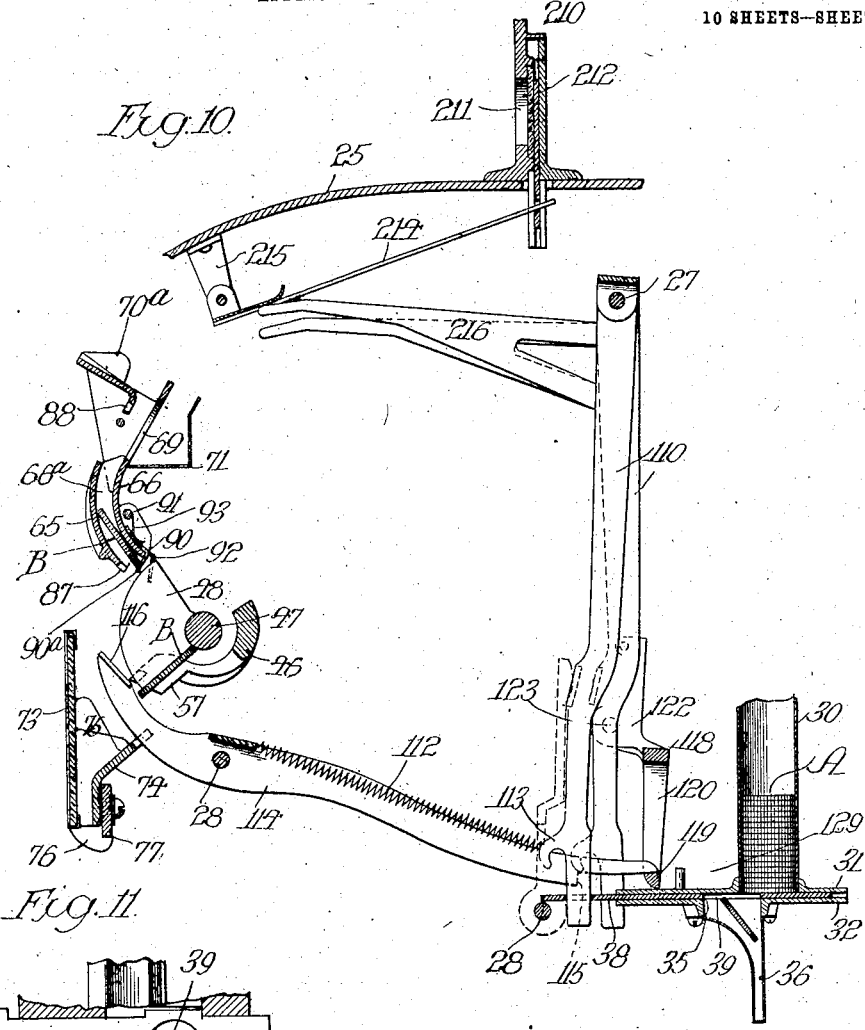
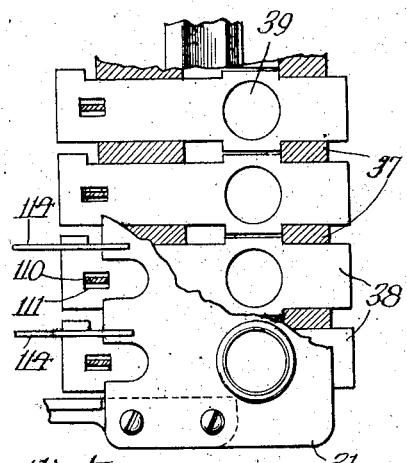
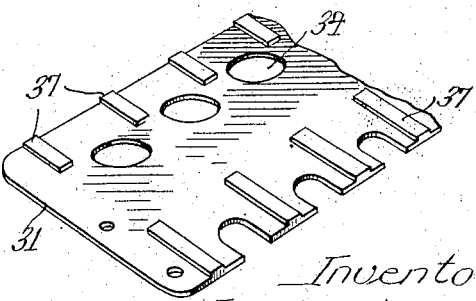
Witnesses
Edw. P. Barrett
M. L. Hall
Inventors
Joseph Paupa
Gustave F. Hochriem
by Poole Brown Attys No. 839,192. PATENTED DEC. 25, 1906.
J. PAUPA & G. F. HOCHRIEM.
VENDING MACHINE.
APPLICATION FILED FEB. 5, 1906.
10 SHEETS—SHEET 9.
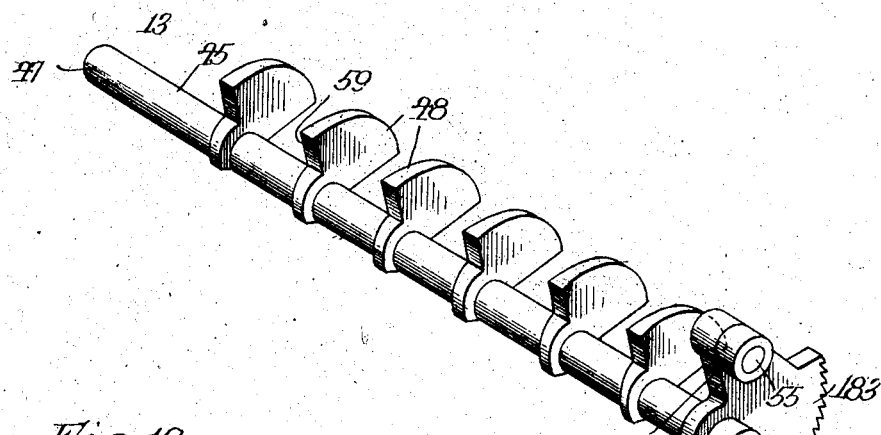
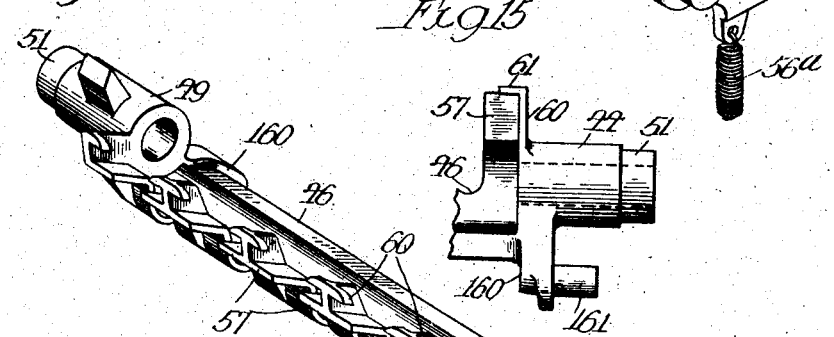
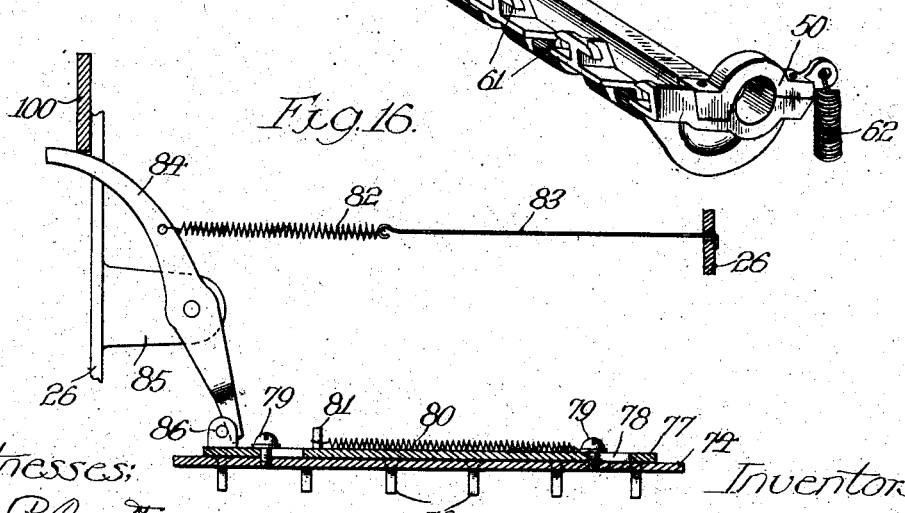
Witnesses:
Edw. P. Burrett
W. L. Hall
Inventors
Joseph Paupa
Gustave F. Hochriem
by Poole Brown Attys No. 839,192. PATENTED DEC. 25, 1906.
J. PAUPA & G. F. HOCHRIEM.
VENDING MACHINE.
APPLICATION FILED FEB. 5, 1906.

10 SHEETS—SHEET 10.

Witnesses:
Edw. P. Barrett
W. L. Hall

Inventor
Joseph Paupa
Gustave F. Hochriem
by Poole Brown Attys.

UNITED STATES PATENT OFFICE.

JOSEPH PAUPA AND GUSTAVE F. HOCHRIEM, OF CHICAGO, ILLINOIS.

VENDING-MACHINE.

No. 839,192.           Specification of Letters Patent.           Patented Dec. 25, 1906.

Application filed February 5, 1906. Serial No. 299,431.

*To all whom it may concern:*

Be it known that we, JOSEPH PAUPA and GUSTAVE F. HOCHRIEM, citizens of the United States, residing at Chicago, in the county of Cook and State of Illinois, have invented certain new and useful Improvements in Vending-Machines; and we do hereby declare that the following is a full, clear, and exact description thereof, reference being had to the accompanying drawings, and to the letters and figures of reference marked thereon, which form a part of this specification.

This invention relates to a coin-controlled vending-machine; and the invention consists in the matters hereinafter set forth, and more particularly pointed out in the appended claims.

The machine herein shown is designed more particularly for vending checks redeemable in merchandise, such as soda-checks and like tokens of value.

Our invention is herein shown as embodied in a machine embracing, in general terms, a plurality of commodity-receptacles provided with paying-out or ejecting mechanisms and a plural coin mechanism so constructed that a coin inserted into one of the sections or parts of the coin-chute operates only the paying-out mechanism of its associated receptacle, while one of said mechanisms may be separately operated or all or less than all may be simultaneously operated.

Among the objects of our invention is to provide an improved coin mechanism operable upon the insertion of a coin therein for transmitting motion from the manually-operative part thereof to the mechanism to be operated; to provide means for certainly releasing the coin and preventing the repeated operation of the machine by one coin; to provide means for preventing the operation of the machine by a coin of improper size; to provide an improved means for arresting the coin in position for exhibition after it has passed the coin mechanism constructed to release it upon the subsequent operation of the machine; to provide an improved means for preventing the withdrawal of the coin after it has performed its function of operating the machine; to provide an improved means for operating the commodity-ejecting or paying-out mechanism by the coin while held in the coin mechanism; to provide means for tripping the locking-lever of the paying-out slide of the commodity-receptacle with the coin while contained in the coin mechanism, combined with means for holding said lever in its inoperative position; to provide a novel operative connection between the positively-operated member of the coin mechanism and the paying-out mechanism; to provide an improved means for setting the paying-out mechanism to release the commodities from the receptacles and thereafter ejecting the released commodities; to provide means for locking the coin-actuated member of the coin device at the end of its throw, combined with means for thereafter releasing it to permit it to be returned to its normal position; to provide a novel governor-controlled mechanism for releasing the paying-out mechanism from its set position and for releasing the coin-actuated member of the coin mechanism from its locked position; to provide means for preventing fraudulent operation of the machine by tipping the machine so that the coin will not be released from the coin mechanism, and to provide other features of improvement, as will hereinafter appear.

As shown in the drawings, Figure 1 is a perspective view of a machine made in accordance with our invention. Fig. 2 is a side elevation of the frame and the operative mechanism of the machine removed from the casing which incloses the same. Fig. 3 is a front elevation of said frame and operative mechanism of the machine. Fig. 4 is a top plan view of said parts with the inclosing frame shown in the horizontal section. Fig. 5 is an elevation at the right-hand side of the machine with the casing shown in vertical section. Fig. 6 is a vertical section of the machine. Fig. 7 is a fragmentary view showing the setting-lever, its connection with the coin mechanism and the operative connections between the setting-lever and commodity-receptacle paying-out mechanism, an indicator-wheel, and the means for restoring said parts. Fig. 8 is a perspective view of the indicator-wheel-locking lever. Fig. 9 is a perspective view of the governor-actuated tripping device. Fig. 10 is a fragmentary view illustrating the coin-chute, the coin mechanism, and also illustrating the paying-out mechanism for one of the commodity-receptacles and an indicating device for indicating the value of the last sale made by the machine. Fig. 11 is a fragmentary plan view of the ejecting or paying-out mechanism. Fig. 12 is a bottom plan view of the upper plate of said paying-out mechanism. Fig. 13 is a perspective view of the manually actuated member of the coin mechanism. Fig. 14 is a fragmentary view of the coin-actuated member thereof. Fig. 15 is an enlarged side elevation of the left-hand end of the coin-actuated member. Fig. 16 illustrates the mechanism for holding the coins in position to be exhibited and for afterward dropping them into the coin-box. Figs. 17 to 22, inclusive, illustrate the operative connection between the coin-actuated member of the coin mechanism and the setting-lever, showing said parts in the different positions they occupy in one cycle of their movement.

As shown in the drawings, 25 designates a case which incloses the principal operative parts of the mechanism. Said case is provided with a removable back wall 25ª, the detachment of which permits the removal of the principal operative parts of the machine. The mechanism is supported upon a frame consisting of side members 26 and transverse upper and lower horizontal tie-rods 27 28. The said side members are irregularly shaped to provide the proper bearings and supports for the mechanism.

The machine as herein shown is designed to vend checks or like tokens of value, (designated by A in Fig. 10,) and said checks are contained in stacks in vertical receptacles 30, located at the rear of the machine. A plurality of receptacles are employed for vending a plurality of checks of like or different values, and the coin mechanism is so constructed that the ejecting or paying-out mechanism of any receptacle may be operated at will, while the paying-out mechanisms for the other receptacles remain inoperative. More than one coin may be inserted into the machine to operate the paying-out mechanism of more than one receptacle at a time. The said receptacle rests on a base comprising upper and lower flat horizontal plates 31 32, Figs. 5 and 12, which rest on shelves 33, formed on the side members of the frame. The upper plate 31 is provided with a plurality of openings 34, in which the bottoms of the receptacles are fitted and which constitute the discharge-openings for said receptacle. The lower plate 32 is provided out of line with the opening 34 of the upper plate with discharge-openings 35, located over the mouth or throat of the discharge-chute 36 of the machine that discharges the checks through the right-hand wall of the casing. The upper and lower plates are vertically separated by means of ribs 37, formed on the upper plate and fitting flat on the lower plate, and between said ribs are formed, in line with the openings 34 and 35, slideways for ejecting-slides 38, that are movable horizontally forwardly and rearwardly. Said slides are each provided with an opening 39, adapted to receive when in its rearward position the bottom check of the stack contained in the superjacent receptacle, and when said slide is moved forwardly by the mechanism hereinafter to be described said check is moved forwardly into line with and discharged through the opening 35 of the lower plate into the chute 36, through which it is discharged from the machine. The ejecting-slides 38 tend to normally occupy a forwardmost position under the action of suitable springs, and they are adapted to be moved rearwardly with their openings 39 in line with the receptacles 30 by setting mechanism actuated by the coin mechanism hereinafter to be described and are thrust forwardly when released from said setting mechanism by their springs for ejecting the check received thereby from the receptacle when occupying their rearward positions.

Referring now to the coin mechanism for operating the commodity paying out or ejecting mechanisms and the means for delivering thereto the coins and for controlling the coins to avoid fraudulent operation of the machine, these parts are made as follows: The coin mechanism is a plural mechanism, it being designed to receive a plurality of coins to severally operate the paying-out or ejecting mechanisms of the plurality of commodity-receptacles and constructed to operate the paying-out mechanisms separately by the insertion of a single coin into the machine at a time or to operate more than one or all said mechanisms simultaneously by the insertion of a plurality of coins into the machine at one time. The said coin mechanism embraces as its elementary constituents two horizontal rocking members 45 and 46, located at the front of the machine and shown in detail, respectively, in Figs. 13 and 14 and best shown in place in the machine in Figs. 4, 5, 6, and 10. The rocking member 45 comprises a rock-shaft 47, provided with a plurality of longitudinally-spaced radial arms 48. The rocking member 46 is provided with end bearings for the rock-shaft 47, it being provided at one end with a short bearing-sleeve 49 and at its other end with a split or two-part bearing 50. The bearing-sleeve 49 is extended to constitute a bearing-stud 51, that has rocking bearing in a bracket 51ª, fixed to the left-hand member of the machine-frame, and the rock-shaft 47 extends beyond the bearing 50 and has rocking bearing in the right-hand member of the frame, Figs. 2 and 5. The lower rocking member 46 is hollow or concave in its upper surface, Figs. 10 and 14, to partially receive the rock-shaft 47. The rock-shaft 47 constitutes the manually-operable part of the coin mechanism and is designed to be rocked through the medium of a hand-lever 52, Figs. 1, 4, and 5, pivoted to the right-hand casing-wall by means of a pivot-stud 53. The connection between the rock-shaft 47 and said hand-lever consists of a crank-arm 54, fixed to the rock-shaft just inside the adjacent frame member and provided with a laterally-extending crank-pin 55, Figs. 5 and 13, that is engaged by a loop 56 on said lever, whereby depression of said lever serves to rock the shaft 47 forwardly. Preferably said crank-pin 55 is provided with an antifriction bearing sleeve or collar. A spiral contractile spring 56$^a$ normally holds the rocking member 45 at the rearward limit of its swing.

The construction of the rocking members of the coin mechanism is such that the upper rocking member 45 is free to rock forwardly and without transmitting motion to the lower rocking member 46 and the parts operatively connected therewith when there is no coin in the machine. The presence of a coin between the rocking members constitutes a bridging connection such as to transmit the rocking movement of the upper rocking member to the lower rocking member, and therethrough to the parts operated thereby. The construction whereby this result is effected is made as follows: The said lower rocking member of the coin mechanism is provided on its forward margin with forwardly-extending arms 57, separated by spaces located in line with the arms 48 of the rock-shaft 47, so that normally the said arms 48 are free to swing through said spaces when the shaft 47 is rocked in its bearings. Said arms 48 of the upper rocking member are provided with straight forwardly-facing margins 59, that in the normal position of the mechanism are parallel with, but separated a distance from, the upper faces of the arms 57, whereby is formed between the adjacent faces of the arms a space to receive the coins B from a coin-chute 58, Fig. 6. The said coin-space between the arms of the rocking member is divided into a plurality of individual coin spaces or pockets by means of narrow partitions 60, rising centrally from the upper faces of the arms 57 of the lower rocking member of the coin device, and the coin-chute 58 is similarly divided, thereby insuring that a coin inserted into the machine shall find its way to the proper coin-pocket of the coin mechanism for which it is intended and also insuring that said coin shall operate the particular commodity-paying-out mechanism to which such coin space or pocket is appropriated. The said partition-flanges are provided with laterally-extending lugs, serving as guides for the coins, which prevent the coins being forced out of place between the rocking members in case they should not pass freely into the pockets. As a result of the arrangement of the arms of said rocking members a coin inserted between the arms spans two adjacent arms 57 and stands in the path of the adjacent arms 48 of the rocking member and constitutes a bridge connection by which the rocking movement of the upper member is transmitted to the lower member, and the rocking movement of the lower member is transmitted by the means hereinafter described to operate the vending mechanism. The lower rocking member is returned to normal position by means of a spiral contractile spring 62, attached at one end to the split bearing 50 thereof, as herein shown, and at its other end to the same lug to which the restoring-spring for the upper rocking member is attached. In the present instance the coin mechanism operates through intermediary mechanism operatively connected with the lower rocking member of the coin mechanism and the paying-out mechanisms of the commodity-receptacles to set the paying-out mechanisms to release a check or other article vended at the time the rocking members are rocked forward, and the checks or other articles so released are discharged from the machine when the paying-out mechanisms are restored to normal. Means are provided (hereinafter to be described) which operate at the end of the rocking movement of the rocking members of the coin mechanism for separating said members, so as to permit the coin to freely drop away therefrom and prevent the rocking members being returned to normal positions with the coin between them, thereby preventing the machine being operated more than once by the use of the same coin.

Before describing such intermediary mechanism and the manner of setting the paying-out mechanisms attention is called to the construction of the coin-chute and to certain features of novelty therein and to the means of disposing of the coin after it has performed its function of operating the coin mechanism, and therethrough the vending mechanism.

The said coin-chute 58 is formed principally between the front and rear walls 65 66, respectively, extending horizontally between and fastened in any suitable manner to the side members of the frame and to each other. The said coin-chute may lead directly from the slot 67 in the top wall of the casing, if desired; but I prefer as a precautionary measure to make the chute and the path of the coin therethrough indirect. The discharge end of the chute is disposed parallel with the coin-space between the rocking members. The said chute is divided into a plurality of separate coin-passages by partitions 66$^a$, made integral with the rear wall 66 of the chute and located in line with the partitions 60 of the arms of the lower rocking member of the coin mechanism.

Means are provided for preventing the passage of a coin through the chute smaller than that designed to operate the vending mechanism, such means being herein shown as made as follows: The rear wall 66 of the chute is provided near its upper margin and above and between the chute-partitions 66$^a$ with a plurality of openings made of a diameter slightly smaller than that of the coin which is adapted to operate the mechanism. The coins fall from the slot 67 directly upon an inclined table 70, that is located above and in front of said openings 69 and is inclined so as to direct the coins against the perforated rear wall, so that a coin of smaller diameter than required to operate the mechanism drops through the opening 69 to a box 71, placed to receive the same. The table 70 is divided into coin-passages in line with the passages in the chute by ribs $70^a$ rising from the table. The said ribs $70^a$ coöperate with the partitions $66^a$ to form separate passages for the coins which lead the same to the proper pockets formed between said rocking members, as described.

The coins after having performed their function of operating the mechanism are deposited into a money-box 72. They are not deposited however, directly from the coin-pockets of the rocking members, but are detained or temporarily arrested in rear of a transparent section $25^c$ of the front wall of the casing and remain in this position for inspection from the front of the machine until the subsequent operation of the machine. As herein shown, the coins are detained for inspection in a narrow transverse chamber formed between the transparent wall-section 73 and a transverse rear plate 74, Figs. 6 and 10, having its lower part parallel with said transparent section and its upper part inclined upwardly and rearwardly, so as to properly direct the coins into said chamber. Said chamber is divided into a plurality of pockets equal in number to the number of separate coin-passages in the chute and to the number of commodity-receptacles 30 by means of vertical partitions 75, formed integral with the rear wall 74 of said chamber. The coins are supported in said chamber on a number of lugs 76, Figs. 3, 10, and 16, which extend horizontally forwardly beneath the rear wall 74 of the chamber, and therefore across the bottom of said chamber. Said lugs are formed integral with a bar 77, that is horizontally movable endwise of the rear wall of the chamber, and they stand normally centrally between the partition 75, so as to arrest the coins in the manner shown in Fig. 3. During the subsequent operation of the machine the bar is shifted endwise to bring the lugs out of line with the pockets and thereby permit the coins to drop into the coin-box below. The movable connection of said bar 77 with the rear wall of the coin-exhibition chamber is permitted by means of slots 78, through which the screws 79 extend that attach the bar to said plate or wall. A spring 80, attached at one end to one of the screws 79 and at its other end to a lug or pin 81, extending rearwardly from said bar, normally holds the bar with the lugs 76 in operative position to arrest the coins, as shown in Fig. 3. The bar 77 is moved endwise to shift the lugs into position to discharge the coins through the medium of a spiral contractile spring 82, attached at one end to a rod 83, fixed to the right-hand side member 26 of the frame, and at its other end to a horizontally-swinging lever 84, which is hinged to a lug 85, extending inwardly from the left-hand side member 26 of the frame. The said lever 84 engages at its forward end a lug or shoulder 86, formed on the adjacent end of the slide-bar. The spring 82 is stronger than the spring 80, and when said lever 84 is unrestrained the slide-bar and the lugs carried thereby shift toward the left-hand side of the machine for the purpose set forth. The said lever 84 is normally held with its forward end swung inwardly by means of a vertically-swinging setting-lever 100, hereinafter described, and when said lever 100 swings rearwardly the spring 82 operates the slide to release the coin or coins in the manner before described.

In order to avoid a coin being withdrawn from the coin-chute, as by means of a string attached thereto, after it has performed its function of operating the coin mechanism, the lower margin of the outer wall 65 of the coin-chute and the lower margin of the inclined table 70 at the upper end of said chute are provided with slits or notches 87 88, respectively, Figs. 6 and 10, which are sharp at their angles and which serve to sever a string attached to a coin for the purpose of fraudulently withdrawing the same in the manner mentioned.

As before stated, the lower rocking member is locked at the limit of its throw for a time after the upper rocking member is restored to its normal position if the latter be released at the limit of its rocking movement. It is desirable, therefore, to provide a guard to prevent a coin which may be inserted into the chute at a time when the lower rocking member is locked down and the upper member has returned to its normal position from passing through the chute and falling inoperatively between the widely-separated members of the coin mechanism. To avoid this, we have provided at the lower or discharge side of the coin-chute a guard 90, Figs. 6 and 10, consisting of a bar that is swingingly mounted on a pivot-rod 91, fixed to the rear wall of the chute and provided with fingers $90^a$, that are adapted when the bar swings forwardly to extend across the mouth of the chute. Said bar is provided with an intermediate finger 92, that is adapted when the coin mechanism is in operative position to receive a coin to engage one of the partitions 60 of the lower rocking member of the coin mechanism, Fig. 6, and thereby hold the guard-fingers $90^a$ out of the path of the coin. When said lower rocking member is swung forwardly, as indicated in Fig. 10, the said guard is swung forwardly by gravity, assisted by a spring 93, to bring the guard-fingers in the path of and in position to arrest the coin.

It will be observed that the upper margins of the arms 48 of the upper rocking member are curvedly elongated and swing beneath the discharge-mouth of the chute, and said arms serve to prevent the accidental release of the coins from the chute so long as the said upper rocking member is in its forward position, Fig. 10. It is after the upper member has been returned to normal and while the lower rocking member is still locked in its lowermost position that the guard-fingers 90ª serve to prevent the coins dropping through and from the chute.

Referring now to the operative mechanism between the coin mechanism and the commodity-paying-out mechanisms, these parts are made as follows: 100 designates a vertical y-swinging setting-lever that is pivoted at its lower end to a pivot pin or stud 101, fixed to the lower side of the left-hand member of the frame, Figs. 3 and 6. Said lever swings toward and away from the rocking coin-controlled mechanism and is held normally in its forward position by means of a spiral contractile spring 102, which is attached at one end to a hooked lug 103 of the lever and at its other end to a lug 104, fixed to the adjacent side member of the frame. Said setting-lever is provided at its upper end with a rearwardly-directed arm 105. It is thrown rearwardly by the coin-controlled mechanism for the purpose of setting the slides of the paying-out mechanism and is promptly returned to its normal position by its spring, and thereafter the slide-actuating devices of the commodity-paying-out mechanism are operated to release said slides and eject the checks or other articles from said commodity-receptacles. The devices operated by said setting-lever for setting the paying-out mechanisms and for thereafter releasing the ejecting-slides of said mechanisms to discharge the lowermost checks of the superjacent stacks is made as follows: 110 110 designate a plurality of slide-actuating levers which are hinged at their upper ends to the upper transverse tie-rod 27 and extend at their lower ends through suitable apertures 111 in the forward ends of the slides, Figs. 6, 10, and 11. The said levers and slides are provided with retracting-springs 112, that are attached to hooks 113 near the lower ends of the slide-actuating levers and attached at their forward ends to any suitable stationary part of the machine, hereinafter to be described. Said springs normally hold the slides in their forwardmost positions. All of the slides but the last slide or slides operated are held in their rearmost position by means of vertically-swinging locking-levers 114, hinged to the forward horizontal tie-bar 28 and provided at their rear ends with rearwardly-facing shoulders 115, (shown in dotted lines in Fig. 10 and in full lines in Fig. 6,) which are adapted to engage the forward end margins of the slides to hold the same in their rearmost positions. The slide-retracting springs 112 are shown as attached at their forward ends to said locking-levers near their points of pivot.

The locking-levers 114 are each released by engagement of a coin while swinging forwardly between the rocking members with the flat flange 116, ormed on the forward end of the lever, the coin engaging said flange 116 with a wiping contact and orcing the orward end of the lever down and the rear end thereof upwardly. This operation occurs during the latter part of the rocking movement of the coin mechanism. The engagement of the coin with the forward end of said lever raises the rear end thereof but momentarily, and means are provided for holding the rear end of the lever upwardly with the shoulder 115 out of the path of the slide a sufficient time to permit the forward end of the slide to move forwardly beneath the locking-lever past its locking-shoulder through the action of its spring 112.

The means herein shown for holding the levers 114 severally with their locking-shoulders out of the path of their associated slides consists of a horizontal bail-shaped frame located transversely in rear of the slide-stop levers 114, as shown in Fig. 10, and comprising upper and lower horizontal members 118 119, connected by transverse members 120. Said frame is provided at its upper side with forwardly-extending arms 122, pivotally sustained on the frame through the medium of pivot-pins 123, whereby said frame swings or rocks from front to rear of the machine to carry the lower member 119 thereof toward and from the ends of the slide-locking bars 114. Said frame is controlled by two spiral contractile springs 124 125, respectively, by which it is swung to one or the other limit of its throw. The spring 124 is attached at one end to the upper end of one of the arms 122 and at its other end to a link 126, that extends forwardly and is attached to the setting-lever 100, Fig. 6. The spring 125 extends rearwardly from said arm 121, to which it is attached, and the spring is attached at its other end to a pin or stud 127, attached to the adjacent side member of the frame. Said rocking bail-frame is limited in its movement by contact of its lower member with front and rear stops 128 129, rising from the upper member 31 of the base-plate for the commodity-receptacles, Fig. 5. The spring 124 is stronger than the spring 125, and when the setting-lever 100 is in its forwardmost position said spring 124 acts to swing said rocking frame rearwardly against the rearmost stop 129, and therefore in rear of the rearmost ends of the slide-stop bars 114. When, however, the setting-lever 100 is swung rearwardly, it releases the tension on the spring 124 and permits the tension of the spring 125, which is always exerted on the frame, to swing said frame forwardly. The said rocking frame is operated so as to swing its lower member 119 forwardly just after the rear end of one or more of the slide-locking levers 114 are raised, said lower member of the frame swinging under the rear ends of the levers and temporarily holding the same upwardly with their stop-shoulders out of the path of the slides. The rear ends of the stop-levers and the forward face of the lower member of said rocking frame are so fashioned as to permit the frame to swing forwardly sufficiently to engage the raised stop-lever without interference with the stop-levers that remain in their locking positions. The forward movement of each slide of the paying-out mechanism comprises a short primary movement and a longer secondary movement, and the short primary movement is sufficient in length to carry the front margin of the slide beyond the locking-shoulder, so that the subsequent secondary movement of the slide is free and unobstructed. The slides are forced with their apertures past register with the receptacles, and the first or primary forward movement brings said apertures into register with said receptacles, and the temporary arrest of said slides at this time affords ample time for the checks to fall from the receptacles into the slide-openings.

Referring now to the means for swinging the slide-actuating levers rearwardly when the setting-lever 100 is swung rearwardly and to the means for temporarily holding said slide-actuating levers and the slides in their rearward positions after the first or primary movement thereof, while permitting the full movement of certain of the slides that are operative to eject a check or other commodity, said means are made as follows: 130 designates a swinging lever located at the left-hand side of the machine and hinged at its lower end to the upper rearmost tie-rod 28. Attached to or formed integral with said lever is a horizontal bar 131, Fig. 10, that is formed to provide on its upper margin a plurality of fingers 132, Fig. 4, located one in front of each of the slide-actuating levers 110. Said bar is provided at its end remote from the lever 130 with a downwardly-extending bearing-arm 133, Fig. 4, which has rocking bearing on said rearmost tie-rod 28. Said lever 130 and the bar, with the fingers carried thereby, are adapted to be swung rearwardly through engagement of the lever with a lug 135 on the rearwardly-extending arm 105 of the setting-lever 100, and when said lever 130 is thus swung rearwardly the fingers 132, formed on the bar 131, strike such slide-actuating lever 110 as is in its forwardmost position and moves said lever and its slide rearwardly into its set position, in which position it is locked by its associated locking-lever 114. If there be more than one slide in its forwardmost position at the time the setting-lever is swung rearwardly, all of such slides are moved into their set positions. The said lever 130 is locked in its set position by means of a swinging pawl or detent 135, hinged to the upper end thereof and provided on its lower margin with a forwardly-facing shoulder 136, adapted to engage a stop lug or shoulder 137, extending inwardly from the adjacent side frame 26. The said slide-actuating lever is shown in its rearward or set and locking position in Fig. 7, while one of the slides and its actuating-lever are shown in their forwardmost positions in Fig. 10.

In Fig. 6 the slide is shown in its rearward or set position, while the setting-lever 100 and the intermediate lever 130 are in their forwardmost or unlocked positions. Said swinging or hinged detent 135 is swung downwardly toward the stop-lug 137 by means of a spiral contractile spring 138, Figs. 6 and 7, attached at its ends to said lever and detent. When the detent is in its rearward position, as shown in Fig. 7, the lever 130 is under the influence of the retractile springs 112 of such of the actuating-levers 110 whose slides are released from their locking-levers, and when the detent is released the lever 130 is returned to normal by the spring or springs 112 exerting tension thereon. In the operation of the lever 130 and the fingers carried thereby the said parts are swung rearwardly to move the shoulder 136 of the detent 135 slightly past the lug 137, and while said parts are in their rearmost positions the locking-lever 114 of the slide next to be operated is raised by engagement of the coin with the forward end thereof, and the rear end thereof is momentarily held upwardly by the lower member 119 of the swinging bail-like frame in the manner before stated. Upon the retraction of the setting-lever 100 to normal the lever 130 and the slide-actuating lever follows the same until the parts are arrested by engagement of the shoulder 136 of the detent 135 with the lug 137. During this latter movement the slide moves forwardly sufficiently to pass at its forward end margin beyond the shoulder 115 of the locking-lever 114 and to bring its opening into register with the discharge-opening of the receptacle. Immediately after this occurs the forward swing of the setting-lever has placed a tension on the spring 124, thereby swinging the rocking frame rearwardly from the locking-levers 114; but the locking-lever just released is out of the path of its slide and does not interfere with its further or secondary movement forward. In order to permit further forward movement of said slide, the forward end of the detent 135 is raised to release the shoulder 136 from the lug 137, and this is accomplished, as herein shown, by the following mechanism: 140 designates a swinging clock-controlled or governor lever that is fixed to a shaft 141, that forms part of a clock-movement governor, (designated as a whole by 142.) The normal position of said clock-controlled tripping-lever 140 is shown in Fig. 6 with its lower end swung forwardly. When in this position, the forward end of said detent 135 is supported on a lug 143, extending upwardly with said lever. When the setting-lever is swung rearwardly to the position shown in Fig. 7, the lower end of said clock-controlled tripping-lever is swung rearwardly by means of a stud 144, carried by the upper end of said setting-lever, which engages said tripping-lever below its center of oscillation. The upper end of the tripping-lever is therefore swung forwardly and swings the lug 143 below the forward end of the hinged detent 135 and allows said detent to drop on the locking-stud 137. In the continued rearward swing of said parts the shoulder 136 of the detent 135 is swung past the stud 137 and drops into locking engagement with said stud. The operative connection between the lower rocking member of the coin mechanism and the setting-lever 100 is such that the lever is restored instantly after setting the parts and after the coin-controlled mechanism has performed its function. The tripping-lever 140, however, returns more leisurely, by reason of the governing influence of the clock mechanism, and in the resumption of said lever to its normal position the lug 143 carried thereby engages the forward end of the swinging detent 135 and raises the same so as to carry the shoulder above the stud 137, so as to release the parts locked by the detent and permit them to return to their normal forwardmost positions by the force of the springs 112, thereby drawing the slide forwardly and ejecting a check from the receptacle asociated with said slide. The tripping-lever 140 is restored to its normal position by means of a spiral contractile spring 140ª, attached at one end to the lower part of said lever and at its rear end to the rear wall of the coin-chute, as herein shown.

A signaling device is provided whereby a signal is given at the operation of either of the paying-out mechanisms. Said signaling device is associated with the slide-actuating levers 110 and is made as follows: 150 designates a rock-shaft extending transversely across the machine beneath the bar carrying the setting-fingers 132. Fixed to said rock-shaft are a plurality of fingers 151, (shown in dotted lines in Fig. 1 and in full lines in Figs. 3 and 6,) and said fingers are severally in position to be struck by the lower ends of the ejecting-slide-actuating levers when the latter are swung forwardly, as clearly shown in Fig. 6. In each operation of the machine, therefore, one of the slide-actuating levers during its forward swing strikes one of said fingers and rocks the shaft forwardly. Attached to one end of the rock-shaft, at the right-hand end of the machine as herein shown, is a rod 152, carrying a bell-clapper 153, that is adapted to strike a bell 154, conveniently located in the upper part of the machine-frame and mounted on the right-hand end member of the frame.

Figure 21:
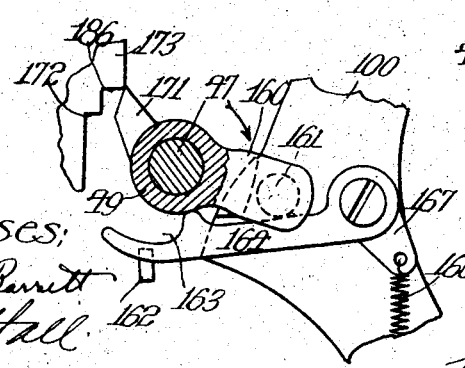
Figure 22:
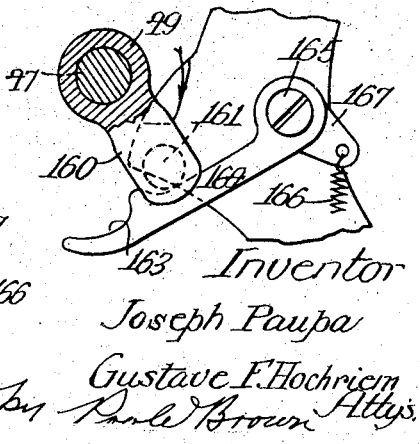

Referring now to the operative connections between the lower rocking member of the coin mechanism and the setting-lever 100, constituting a feature of our invention, said parts are made as follows: The right-hand end of the tubular bearing portion of the rocking member is provided with a rearwardly-directed arm 160, which carries a laterally outwardly extending pin or stud 161. The said lower rocking member and the arm 160 swing in the direction indicated by the arrows in Figs. 17 to 22 and is arrested at the limit of its movement by means of a suitable stop 162, formed on the machine-frame. The pin 161 engages an upwardly-opening concave recess 163, formed on the forward end of a detent-lever 164, that is pivoted to the setting-lever 100 by means of a pin 165. Said detent-lever is held yieldingly against the stud or pin by means of a spiral contractile spring 166, that is attached at one end to a short arm 167, integral with the arm 164, and at its other end to a lug 168, carried by the setting-lever, Fig. 7. By reason of the presence of the lug 169, which constitutes the rear wall of the recess 163 of the lever 164, when the arm 160 and the pin 161 carried thereby are swung rearwardly from the position shown in Figs. 17 to the position shown in Fig. 18 and also Fig. 7 the said pin is forced rearwardly against said lug 169 and acts, through the detent-lever, to swing the setting-lever rearwardly the required distance, its greatest rearward swing being that indicated in Figs. 7 and 18. In the further rotation of the arm 160 and pin 161 the said pin is released from the lug 169 and permits the setting-lever 100 to move forwardly under the influence of its spring 102. The forward margin of said lever is provided above the detent-lever 164 with a cam-lug 170, extending inwardly from the inner face of said lever, and when the pin 161 moves off the lug 169 of the lever 164 the setting-lever swings forwardly to bring the cam projection into engagement with the pin, Fig. 19. Said cam projection is so shaped as to swing the arm 160 upwardly and the arms 57 of said lower rocking member downwardly. This operation occurs just as the manually-operable rocking member of the coin mechanism has been swung through its complete movement, and the downward swing of said arms 57 of the lower rocking member as thus automatically effected has the effect of spreading the arms of the upper and lower rocking members of the coin mechanism and freely releasing the coin, notwithstanding continued downward pressure on the upper or manually-operable rocking member, a result to which attention has been already directed. The forward swing of the setting-lever carries the cam projection 170 below the level of the pin 161 and causes the pin to pass behind said projection. The restoring-spring 62 of the lower rocking member now becomes active and imparts a return rocking motion to said member, which carries the pin 161 downwardly behind the cam projection until it is again engaged with said lever 164. Said lower rocking member of the coin mechanism is, however, temporarily locked or restrained in its movement at the stage of its movement when the pin 161 passes over the upper end of the cam projection, Fig. 20, by the engagement of a lug 171 on the bearing-sleeve portion of the lower rocking member with a downwardly-facing locking-shoulder formed on a swinging lever 173, that is pivoted to the adjacent end frame of the machine by means of a pivot-pin 174, Figs. 6 and 7. A spiral contractile spring 175, attached at one end to a short arm 176 of said lever and at its other end to a lug 177 on the machine-frame, serves to hold the lever pressed toward said lug 171. The lower rocking member is thus locked from return movement, while the upper rocking member is permitted to return through the action of its restoring-spring 56. Such temporary locking of the lower rocking member of the coin mechanism gives the coin ample time to be released after performing its functions as a means for controlling the operation of the machine. After such temporary restraint of said lower rocking member the swinging lever 173 is swung away from the locking-lug 171 by means hereinafter to be described, and in the return movement of the lower locking member the pin 161 passes downwardly behind the cam-lug 170 of the setting-lever, as indicated in Fig. 21, into engagement with the upper surface of the connecting link or lever 164, behind the lug 169 thereof, and in the completion of the swing of said parts, as indicated in Fig. 22, the said pin is brought again into engagement with the said recess 163, as indicated in Fig. 17.

The locking-lever 173 is swung forwardly to release the lower rocking member by the following devices: 180 designates a horizontal swinging bar, which is hinged at its forward part to the upper end of the locking-lever 173 and extends rearwardly therefrom. Said bar is provided with a shoulder 181, and the reduced rear end thereof extends through a loop 182 at the lower end of the clock-controlled tripping-lever 140, as shown in Figs. 6 and 7. When the parts are moved to their set position, the loop 182 of the tripping-lever moves rearwardly along the reduced end of the bar 180, and during the forward throw of the lower end of the tripping-lever the loop carried by the lever strikes the shoulder 181, reciprocates the same forwardly, and thereby swings the upper end of the locking-lever 173 away from the locking lug or detent 171 of the lower rocking member of the coin mechanism and permits the return of the latter to normal by its spring 62.

Means are provided for compelling a full throw of the rocking members after the operation thereof is once started, and thereby necessitating the full operation of the coin mechanism and the release of the coin before the parts may be returned to normal. This result is effected by the following construction, (shown best in Figs. 5 and 13:) The crank-arm 54 of the upper rocking member of the coin mechanism is widened and the rear upper curved margin thereof is toothed to provide a ratchet 183, that is adapted for engagement by a reversible pawl 184, that is pivoted to the adjacent frame of the machine and is placed under the influence of a spiral contractile spring 185, attached to the end of the pawl and to the machine-frame. The arrangement of the pawl permits its engaging end to ride over the ratchet when the crank-arm is swung forwardly and reverses to ride over the teeth in the other direction when said crank-arm is returned to normal, but locks said arm and the parts movable therewith in case said arm should stop short of a full throw. When said pawl thus locks said parts from returning at a time when a coin is contained in the coin mechanism, the force of both springs 56$^a$ and 62 is exerted thereon. In order to relieve said pawl and ratchet mechanism from the strain of both springs, the lower rocking member of the coin mechanism may be locked in an intermediate part of its throw by engagement of the locking lug or detent 171 with a second shoulder 186 on the lever 173 and located above the shoulder 172, as shown in Figs. 7 and 17 to 21, inclusive.

In some instances an indicator-wheel may be employed in connection with the mechanism shown, the periphery of which is divided into a number of sections bearing any desired information and designed to be exhibited through a suitable opening 190, Fig. 2, located in the front wall of the casing. Said wheel embraces a rim 191, a central hub 192, and radiating spokes connecting said rim and hub, as best shown in Fig. 2. The wheel is fixed to and turns with a horizontal shaft 193, that extends transversely across and has bearing in the machine-frame, Fig. 4. Fixed to said shaft between the wheel and the adjacent frame of the machine is a ratchet wheel 194, Figs. 2, 5, and 7, and the lever 100 is provided with a spring-pressed pawl or detent 195, that is adapted in the rearward swing of said lever to ride over the teeth of said ratchet-wheel and in the forward quick swing of said lever to engage the teeth of the ratchet-wheel, and thereby impart a quick rotative impulse to the shaft which will act to rotate the indicator-wheel. The said indicator-wheel is normally locked from rotation by locking devices which are released at the time the setting-lever is swung rearwardly and which remains in an unlocking position for a time after the shaft 193 and the wheel are given a rotative impulse by the means described. Said locking devices are made as follows: Said shaft 193 carries a toothed wheel 196, adapted to be engaged by a locking projection or detent 197, carried by a vertically-swinging lever 198, located at the rear left-hand side of the machine and swinging upon a pivot-pin 199, extending from the adjacent side frame of the machine, Figs. 2, 3, 7, and 8. Said lever is yieldingly held in its forward position with the detent engaging the toothed wheel by means of a spiral contractile spring 200, attached at one end to a lug 201 on the frame and at its other end to a short arm 202, rigid with the lever 198. The said lever 198 is swung rearwardly from the toothed wheel to unlock the indicator-wheel when the setting-lever is swung rearwardly by engagement of the rear end of the setting-lever with the forward margin of the locking-lever 198. The locking-lever 198 is temporarily locked in its rearmost position by means of a spring-pressed detent 203, operating like the detent 135 of the lever 130 before referred to and adapted to coöperate with the locking-lug 137 in a like manner to lock the lever in its rearmost position and is released from said locking-lug by the tripping clock-controlled lever 140, as is evident. The said detent 203 is pressed downwardly by means of a spiral contractile spring 204, attached thereto and to the locking-lever 108, as shown in Fig. 7. When the setting-lever 100 is released, therefore, and swings forwardly, the wheel-locking lever 198 is in its unlocking position, so that the rotation of said wheel continues until the locking-lever swings forwardly under the action of its spring 200 after the detent 203 is released and coöperates with the toothed wheel to arrest the shaft 193 and said indicating-wheel. A suitable brake device may be applied to the shaft 193 to control the speed of rotation of said shaft and wheel. An approved form of brake device is herein shown, consisting of a band-brake 205, surrounding the shaft outside of the right-hand frame member, Fig. 5, and provided with a tension device, consisting, as herein shown, of a spring 206 and a bolt 207, extending through a suitable apertured part of the frame and provided with a nut 208.

Means are provided for exhibiting through a suitable transparent portion of the casing tabs indicating the amount of each purchase, there being provided a number of tabs equal to the number of the commodity-receptacles. This is accomplished by providing at the top of the machine a narrow extension-chamber 210, which rises from the top wall of the casing and communicates at its lower side with the interior of the casing. Said chamber is formed between closely-spaced front and rear walls, and the front wall is provided with a plurality of openings 211, covered by glass or like transparent material, through which are exhibited the tablets bearing figures indicating the amount of the purchases of the commodities vended by the machine. The said tablets 212 are mounted on the rear ends of swinging bars 214, Figs. 5, 6, and 10, which are hinged at their forward ends to brackets 215, depending from the top wall of the case. The slide-actuating levers 110 are provided with forwardly-directed arms 216, one projecting beneath each bar 214, and each adapted, when the associated slide-actuating lever is swung forwardly, to be swung upwardly at its forward end, and thereby swing its associated tablet-bearing bar 214 upwardly and to slide the attached tablet 212, bearing the proper price-mark thereon, upwardly into the chamber 210 in rear of its appropriate opening, where it may be seen from outside the machine. In the subsequent operation of the machine the tablet theretofore elevated drops downwardly by reason of the rearward swing of its associated slide-actuating lever, and another or the same tablet is forced upwardly into said exhibition-chamber, depending upon from which receptacle a commodity is paid out.

In order to prevent the machine from being fraudulently operated by tipping it rearwardly into such position that the coin will not drop from the space between the rocking members of the coin mechanism, whereby the machine may be successively operated by one coin, a safety device is provided which blocks the action of the paying-out mechanisms until the coin is properly released from the coin mechanism. Such safety device consists of a gravity-controlled L-shaped lever 220, that is hinged at its angle to the locking-stud 137 and is provided at the lower end of its vertical arm with a weight 221 and provided at the rear end of its horizontal arm with a rearwardly-facing concave shoulder 222. 223 designates a pin extending laterally inwardly from the left-hand swinging detent. Said pin stands in front of the shoulder 222 of the lever 220 when the parts are in their normal positions, as shown in Fig. 6, and in rear of and above said shoulder and in position to be engaged thereby when the parts are in their set positions. When the parts are in their set positions, therefore, and the machine is tipped in the manner mentioned, the horizontal arm of said lever 220, governed by the weight 221, swings upwardly and interlocks with the pin 223. The concave form of the shoulder is such that the lever remains interlocked with said pin until the subsequent operation of the machine, which operation cannot be fully completed without the release of the coin from the coin mechanism.

Conveniently the casing is provided beneath the slot 67 with a plurality of tablets 225, located one beneath each division of the coin-chute for the purpose of indicating the correct placing of the coins in the coin-slot.

The operation of the machine will be apparent from the foregoing, but may be briefly recapitulated as follows: A coin inserted into the coin-slot 67, in line with one of the coin passages or divisions of the chute, falls upon the inclined table 70, and if it be the proper coin drops past the detector-openings 69 in the rear wall 66 of the chute, through the chute, and into the proper division or pocket of the space between the rocking members 45 and 46 of the coin mechanism. The hand-operated lever 52 is now depressed to rock the said rocking members downwardly with the coin between the same. The first operation effected by said coin mechanism is to swing the setting-lever rearwardly and set all the slides 38 of the paying-out mechanisms which had in the previous operation of the machine operated to pay out a commodity from the machine. At the same time the indicating-wheel-locking lever 198 is swung rearwardly to release said wheel. As soon as the coin mechanism has reached the extreme forward limit of its movement the setting-lever is returned by its spring, while the slide-setting and wheel-releasing levers are retarded in their return movements by their swinging pawls 135 and 203, respectively. Just before the setting-lever 100 is returned the projecting margin of the coin engages the flange 116 at the forward end of the slide-locking lever 114 to raise the rear end thereof and release the associated slide 38, and said raised rear end of the lever is held upwardly by the bar 119, which is rocked forwardly at the proper time beneath the rear end of the lever a sufficient length of time to permit the first or primary forward movement of the slide, the said slide and its actuating-lever moving forwardly during the first part of the return movement of the setting-lever and until arrested by engagement of the shoulder 136 of the detent 135 with the locking-lug 137. Thereafter the swinging detents 135 and 203 of the slide-setting and wheel-releasing levers, respectively, are released and swing forwardly, thereby allowing the slide to move to the forward limit of its movement and eject a check or other commodity from its receptacle, and the forward movement of the wheel-locking lever 198 acts first to rotate the indicating-wheel and finally to lock said wheel from rotation. At the end of the swing of the slide-actuating lever the lower end of the lever strikes its associated finger 151 of the rock-shaft 150 and operates the bell-clapper to sound the signal-bell 154. Thereafter the lower rocking member of the coin mechanism, which was previously locked in its lower position by the locking-lever 173, is released and returned to its normal position by its spring 62, after which the machine is in readiness for another operation upon the insertion of a proper coin thereinto.

It will be understood that the machine may be operated by the insertion thereinto of more than one coin at a time, each coin operating the paying-out mechanism of one of the commodity-receptacles.

We claim as our invention—

1. In a vending-machine, the combination with a coin-controlled mechanism embracing a rocking part, of a spring-retracted lever carrying a spring-pressed pawl provided with an upwardly-facing shoulder, a pin carried by the rocking part designed to engage said shoulder whereby the spring-retracted lever is swung rearwardly when the coin mechanism is operated, a cam projection on said spring-retracted lever above the detent-lever and adapted to engage said pin when the spring-retracted lever is released and swung forwardly, said pin, during the return movement thereof, passing downwardly behind the coin into reëngagement with the detent-lever.

2. In a vending-machine, the combination with a rocking coin mechanism, of a spring-actuated lever carrying a spring-pressed detent-lever provided at its forward end with a recessed or concave shoulder, a radial arm on said rocking member, a pin carried by said arm and engaging said shoulder of the detent-lever, whereby the spring-actuated lever is thrown rearwardly as the rocking member is rotated on its axis, and a cam projection on said spring-actuated lever adapted to engage said pin when released from said detent-lever, said pin, during the return movement of said rocking member, being adapted to pass behind said cam and be reëngaged with said detent-lever.

3. In a vending-machine, the combination with a rocking coin mechanism, of a spring-actuated lever carrying a spring-pressed detent-lever provided at its forward end with a recessed or concave shoulder, a radial arm on said rocking member, a pin carried by said arm and engaging said shoulder of the detent-lever, whereby the spring-actuated lever is thrown rearwardly as the rocking member is rotated on its axis, a cam projection on said spring-actuated lever adapted to engage said pin when released from said detent-lever, said pin, during the return movement of said rocking member, being adapted to pass behind said cam and be reëngaged with said detent-lever, and means for locking the rocking member at the limit of its throw.

4. In a vending-machine, a coin mechanism comprising two rocking members adapted to receive between the same a coin through which motion is transmitted from one member to the other, and a pin carried by and rocking with the latter member combined with a spring-retracted lever carrying a spring-pressed detent-lever engaged by said pin, whereby the spring-retracted lever is swung away from the coin mechanism when the members are rocked forwardly, and a cam on said lever adapted to engage said pin, when released from said detent-lever, to separate the rocking members to release the coin.

5. In a vending-machine, the combination with the rocking member provided with an arm 160 and the pin 161, combined with the lever 100, provided with the detent-lever 164 engaging said pin and the cam projection 170, for the purpose set forth.

6. In a vending-machine, the combination with a commodity-receptacle, a coin mechanism comprising two rocking members adapted to receive between the same a coin and to carry the same through a curved path, a lever operatively connected with the paying-out mechanism of the commodity-receptacle, said lever being outside of the path of said rocking members but in position to be engaged and operated by wiping contact of the coin therewith, and means independent of said coin for engaging the lever to permit further operative movement of said paying-out mechanism.

7. In a vending-machine, a coin mechanism comprising two rocking members adapted to receive between the same a coin through which motion is transmitted from one to the other rocking member, a commodity paying-out mechanism embracing a spring-actuating slide, and a lever for normally locking the slide in its set position, the coin being adapted to engage one end of the lever with a wiping contact to release it from said slide 8. In a vending-machine, a coin-controlled mechanism comprising two rocking members adapted to receive between the same a coin through which motion is transmitted from one to the other rocking member, a commodity-paying-out mechanism embracing a spring-actuating slide, a lever for normally locking the slide in its set position, the coin being adapted to engage one end of the lever with a wiping contact to release it from said slide, and means engaging the rear end of the lever for temporarily holding the same raised out of the path of said slide.

In testimony that we claim the foregoing as our invention we affix our signatures, in presence of two witnesses, this 19th day of January, A. D. 1906.

JOSEPH PAUPA.
GUSTAVE F. HOCHRIEM.

Witnesses:
WILLIAM L. HALL,
TAYLOR E. BROWN.